Dec. 15, 1970   W. E. ALTMANN   3,546,968
SELF-LOCKING DIFFERENTIAL GEAR FOR VEHICLES, ESPECIALLY
FOR MOTOR VEHICLES
Filed Sept. 27, 1968

INVENTOR
WERNER E. ALTMANN

BY
Craig & Antonelli

ATTORNEYS

United States Patent Office 3,546,968
Patented Dec. 15, 1970

3,546,968
SELF-LOCKING DIFFERENTIAL GEAR FOR VEHICLES, ESPECIALLY FOR MOTOR VEHICLES
Werner E. Altmann, Stuttgart, Germany, assignor to Daimler-Benz Aktiengesellschaft, Stuttgart-Unterturkheim, Germany
Filed Sept. 27, 1968, Ser. No. 763,275
Claims priority, application Germany, Sept. 28, 1967, 1,630,361
Int. Cl. F16h 1/44
U.S. Cl. 74—710.5                                7 Claims

ABSTRACT OF THE DISCLOSURE

A self-locking differential gear for motor vehicles in which a housing connected with the drive accommodates the differential pinions, which mesh with the output bevel gears that are connected with the housing and with the output shafts by way of disengageable friction clutches and inclined surfaces, respectively, the axial thrust resulting at the inclined surfaces during the transmission of torque is used to disengage the clutches, which are normally engaged by spring force; the clutches are arranged independently of the output bevel gears and the output bevel gears are arranged axially immovably in the housing.

---

Figure 1:
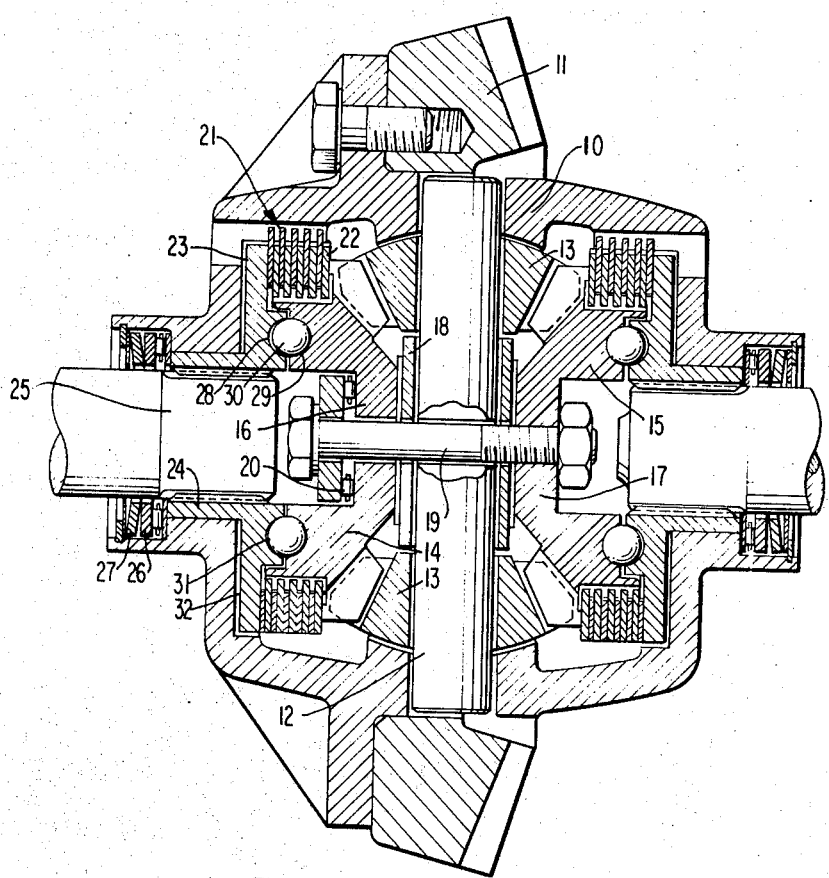

The present invention relates to a self-locking differential gear of bevel gear type construction for vehicles, especially for motor vehicles, which includes a housing operatively connected with the drive or input and accommodating the differential pinions rotating in unison therewith, with which engage the output bevel gears which, in their turn, are operatively connected, on the one hand, by a disengageable friction clutch with the housing and, on the other, by inclined surfaces with the output shafts thereof, whereby the axial thrust resulting from the inclined surfaces during torque transmission serves for the disengagement of the clutch which is kept engaged by a spring force.

A differential gear of the aforementioned type has been proposed already by the applicant of the corresponding German application. The clutches, either lamellae or cone clutches, are thereby coordinated to or associated with the output bevel gears. The clutches, in addition to being loaded by the springs by way of these output bevel gears, are additionally loaded or acted upon by the tooth pressure. The forces thereby acting on the clutches cannot be controlled in practice without difficulty so that the clutches under certain circumstances tend to jamming and the differential gear does not disengage timely and completely satisfactorily from its locked or blocked condition.

The present invention aims at eliminating the aforementioned disadvantages. It solves the underlying problems with the differential gears of the aforementioned type in that the clutches are arranged independently of the output bevel gears, and the output bevel gears are arranged axially non-displaceably within the housing. It is achieved in this manner that the clutches are kept engaged exclusively under the influence of their springs. The tooth pressure occurring during torque transmission at the bevel gears or pinions does not become effective on the clutches. The clutches can therefore be adjusted by means of the springs to an accurately predetermined torque so that upon exceeding the same, they can be disengaged completely satisfactorily. Consequently, a completely satisfactory self-locking as well as a completely satisfactory curve drive can be achieved with the differential gear according to the present invention.

In a preferred embodiment of the present invention, the two output bevel gears are connected with each other in an axially immovable, but mutually relatively rotatable manner and are nondisplaceably secured at the spider of the differential gear. In particular, the present invention proposes therefore that both output bevel gears are provided with radially inwardly directed flanges which are tightened by means of a central bolt under interposition of at least one axial bearing against a fitting sleeve secured on the spider.

The clutches can be constructed as cone or lamellae clutches. In both cases, it has already been proposed to arrange the clutches essentially concentrically about the output bevel gears. In that case, it is proposed according to the present invention that the clutches constructed as lamellae clutches are supported on the side thereof facing the spider against an extension at the housing or at the output bevel gears and that they are adapted to be acted upon on their opposite outer side from pressure disks by means of springs.

A further feature of the present invention resides in that the pressure disk is provided with a hub portion by means of which it is nonrotatably arranged on the output shaft. According to one type of construction of the present invention, the pressure disk is supported with the end face of its hub portion by means of an axial bearing against the spring which, on the other, rests or abuts in the housing. It is, of course, also feasible to provide the axial bearing, not between the hub portion and the spring but rather between the spring and the housing.

In another type of construction according to the present invention, the spring abuts against the backside of the pressure disk and is arranged concentrically about the hub portion, and it is supported by means of an axial bearing against a sleeve concentrically surrounding the hub portion which sleeve is readjustably arranged in the housing. In this manner, the clutch can be adjusted to different torques and above all, can be readjusted corresponding to the wear. It is also feasible in connection therewith to arrange the bearing between the spring and the sleeve or also between the sleeve and the housing.

Accordingly, it is an object of the present invention to provide a self-locking differential gear of bevel-type construction for vehicles, especially motor vehicles, which eliminates by simple means the aforementioned shortcomings and drawbacks encountered in the prior art.

Another object of the present invention resides in a self-locking differential gear of the type described above in which the forces acting on the clutches are readily controllable, thereby avoiding jamming or improper disengagement of the differential gear from its locking condition.

A further object of the present invention resides in a differential gear in which the clutches can be adjusted to accurately predetermined torques so that disengagement occurs upon exceeding of such accurately predetermined torque.

Still a further object of the present invention resides in a differential gear of the type described above which permits the realization of a completely satisfactory self-locking as well as a completely satisfactory curve drive.

Figure 2:
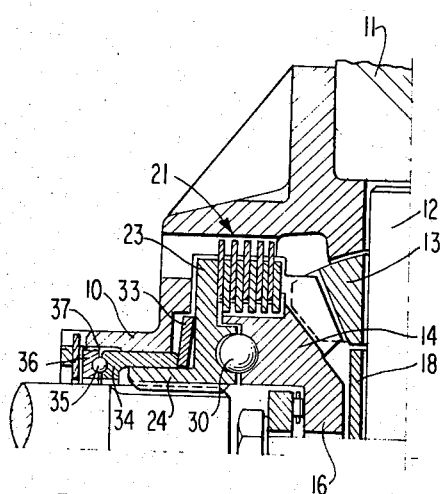

These and further objects, features, and advantages of the present invention will become more obvious from the following description when taken in connection with the accompanying drawing which shows, for purposes of illustration only, two embodiments in accordance with the present invention, and wherein:

FIG. 1 is an axial cross-sectional view through a self-locking differential gear in accordance with the present invention; and FIG. 2 is a partial cross-section view through a modified embodiment of a differential gear in accordance with the present invention.

Referring now to the drawing wherein like reference numerals are used throughout the two views to designate like parts, according to FIG. 1, the spider 12 with the differential pinions 13 is arranged within the housing 10 of the differential gear which is driven by the bevel gear wheel 11. The output bevel gears 14 and 15 mesh with the differential pinions 13. The output bevel gears 14 and 15 are provided with inwardly directed flanges 16 and 17. The spider 12 carries a fitting sleeve or bush 18 which is axially immovable with respect thereto. Both output bevel gears 14 and 15 are securely kept in abutment at the fitting sleeve 18 by means of the flanges 16 and 17 thereof by a central bolt 19. An axial bearing 20 thereby enables the relative rotation of the output bevel gears 14 and 15 with respect to one another in case of a curve drive. An axial displacement of the two output bevel gears 14 and 15, however, is not possible. The tooth pressure occurring during torque transmission between the differential pinions 13 and the output bevel gears 14 and 15 is absorbed in this manner by the bolt 19—i.e., the system is closed in itself—and neither a movement nor a force influence toward the outside occurs.

The construction of the differential gear to both sides of the spider 12 is symmetrical so that only one side will be described more fully hereinafter. A lamellae friction clutch generally designated by reference numeral 21 is disposed concentrically about the output bevel gear 14. The friction disks of the clutch 21 are arranged alternately in housing 10 and in the output bevel gear 14. The clutch is supported by means of a counter-abutment 22 against an extension in the housing or against an extension at the output bevel gear 14.

The clutch 21 is acted upon by a pressure disk 23 which is arranged under corresponding play within the housing 10 on the backside of the output level gear 14. This pressure disk 23 is nonrotatably arranged with its hub portion 24 on the output shaft 25, for example, by means of a spline connection. The hub portion 24 is supported with the end face thereof by way of an axial bearing 26 at a spring 27 which supplies the abutment or engaging force for the clutch 21 and which, on the other, is supported in the housing 10.

Deflecting surfaces 28 and 29 are arranged concentrically within the clutch 21 between the output bevel gear 14 and the pressure disk 23. The deflecting surfaces 28 and 29 extend sinusoidally shaped over the entire circumference and balls 30 are arranged between the same. The arrangement is thereby made in such a manner that a play 31 is present between the balls 30 and the deflecting surfaces 28 and 29 which is slightly larger than the play 32 between the pressure disk 23 and the housing 10. The clutch 21 is normally kept engaged by the spring 27. As a result thereof, the output bevel gear 14 is nonrotatably secured with respect to the housing 10, and the entire differential gear is locked or blocked in itself. If one of the two wheels no longer has any road traction, the vehicle can be started in this condition.

During torque transmission between the output bevel gear 14 and the output shaft 25, the balls 30 run up on the deflecting surfaces 28 and 29 so that the pressure disk 23 is axially displaced against the effect of the spring 27. The clutch 21 is disengaged thereby and the locking effect of the differential gear is lifted. In this condition, driving may be carried out as with any normal differential gear. If one of the two wheels loses in this condition its road traction, then no torque is transmitted any longer on this side, i.e., the effect of the deflecting surfaces 28 and 29 stops. The spring 27 thereby reengages the clutch 21—and more particularly on the side coordinated to the particular wheel. The differential gear is again locked thereby and the drive can be continued with a locked differential gear.

Each clutch 21 is adapted to be acted upon exclusively by its spring 27. The tooth pressure occurring at the teeth cannot affect the clutch 21 because a displacement of the output bevel gears 14 and 15 cannot occur.

The embodiment according to FIG. 2 is essentially identical in its major features to that of FIG. 1. In deviation from the construction of FIG. 1, only the spring 33 for actuation of the clutch 21 is arranged concentrically about the hub portion 24 of the pressure disk 23. The spring 33 therefore abuts, on the one hand, against the backside of the pressure disk 23 and is supported, on the other, against a sleeve 34 also concentrically surrounding the hub portion 24. The sleeve 34, in turn, is supported by way of an axial bearing 35 against a counterbearing ring or race 36 which is adjustably inserted into the housing 10 by means of an external thread 37. It is possible in this manner to change by rotation of the abutment race 36 the tension of the spring 33 and/or in case of wear of the clutch lamellae to bring back the spring force to its pre-existing value.

The operation of the differential gear of FIG. 2 corresponds to that of FIG. 1.

While I have shown and described only two embodiments in accordance with the present invention, it is understood that the same is not limited thereto but is susceptible of numerous changes and modifications as known to a person skilled in the art.

For example, the deflecting surfaces 28 and 29 may also be constructed as individual pockets whose flanks are inclined and which are rounded-off at the bottom with the ball radius. It is also within the purview of the present invention to arrange continuously extending sinusoidally shaped tracks at one part and to arrange at the other part pockets for receiving the balls.

Thus, it is obvious that the present invention is susceptible of numerous changes and modifications, and I therefore do not wish to be limited to the details shown and described herein, but intend to cover all such changes and modifications as are within the scope of those skilled in the art.

What is claimed is:

1. A self-locking differential gear for vehicles, especially motor vehicles, which includes a housing operatively connected with the drive, differential pinion means within said housing and rotating in unison therewith, output bevel gears operatively connected with said pinion means wherein said output bevel gears are connected with each other in an axially nondisplaceable but mutually relatively rotatable manner, a spider, and means securing said output bevel gears nondisplaceably at said spider, said output bevel gears being operatively connected, on one hand, with said housing by disengageable friction clutch means located in said housing and, on the other hand, with the respective output shafts by deflecting surface means, whereby the axial thrust resulting from the deflecting surface means during torque transmission serves for the disengagement of said clutch means, spring means normally engaging said clutch means, said output bevel gears being provided with radially inwardly directed flange means, a sleeve means secured on said spider, and means including a central bolt for securing said flange means by way of at least one axial bearing against said sleeve means, wherein said output bevel gears are axially nondisplaceably arranged within said housing, and said clutch means are arranged to engage independently of said output bevel gears.

2. A differential gear according to claim 1, wherein the clutch means are arranged essentially concentrically about the output bevel gears, the clutch means including lamellae clutches supported on the side thereof facing the spider against an extension provided in one of the two parts consisting of the housing and the respective output bevel gear, and spring-loaded pressure disk means operable to act upon the opposite side of the clutch means.

3. A differential gear according to claim 2, wherein the deflection surface means includes inclined surfaces extending sinusoidally over the circumference of said output bevel gears and said pressure disk means with ball means arranged therebetween, in such a manner that play is provided between the ball means and inclined surfaces which is slightly greater than play provided between the pressure disk means and said housing in the engaged position of said clutch means.

4. A differential gear according to claim 2, wherein each pressure disk means includes a hub portion, said hub portion being nonrotatably arranged on the respective output shaft.

5. A differential gear according to claim 4, wherein said spring means acts upon said pressure disk means to engage said clutch means.

6. A differential gear according to claim 5, wherein each pressure disk means abuts with the end face of the hub portion thereof against the spring means by way of an axial bearing, said spring means, on the other, being supported in the housing.

7. A differential gear according to claim 5, wherein the spring means abuts against a side of the pressure disk means and is arranged concentrically about the hub portion, a sleeve being adjustably arranged in the housing and concentrically surrounding the hub portion, and said spring means being supported by way of an axial bearing against said adjustably arranged sleeve.

References Cited

UNITED STATES PATENTS

| | | | |
|---|---|---|---|
| 2,234,591 | 3/1941 | Fitzner | 74—711 |
| 2,720,796 | 10/1955 | Schou | 74—711 |
| 2,720,797 | 10/1955 | Huddleston et al. | 74—713 |
| 3,330,169 | 7/1967 | Carrico et al. | 74—711 |
| 3,361,008 | 1/1968 | Fallon | 74—711 |

FOREIGN PATENTS

| | | | |
|---|---|---|---|
| 671,445 | 10/1963 | Canada | 74—710.5 |
| 927,924 | 6/1963 | Great Britain | 74—711 |

ARTHUR T. McKEON, Primary Examiner